United States Patent
Layne et al.

(10) Patent No.: US 7,841,462 B2
(45) Date of Patent: Nov. 30, 2010

(54) SIDE-FLEXING CONVEYOR CHAIN WITH PIVOTING SLATS AND RELATED METHODS

(75) Inventors: James L. Layne, Bowling Green, KY (US); Lewis W. Ward, Glasgow, KY (US); B. Keith Thomas, Cave City, KY (US); Mark D. Russell, Goodlettsville, TN (US)

(73) Assignee: Span Tech, LLC, Glasgow, KY (US)

( * ) Notice: Subject to any disclaimer, the term of this patent is extended or adjusted under 35 U.S.C. 154(b) by 88 days.

(21) Appl. No.: 12/302,080

(22) PCT Filed: May 24, 2007

(86) PCT No.: PCT/US2007/069644

§ 371 (c)(1),
(2), (4) Date: Nov. 24, 2008

(87) PCT Pub. No.: WO2007/140242

PCT Pub. Date: Dec. 6, 2007

(65) Prior Publication Data

US 2009/0107805 A1 Apr. 30, 2009

Related U.S. Application Data

(60) Provisional application No. 60/802,898, filed on May 24, 2006.

(51) Int. Cl.
*B65G 21/16* (2006.01)

(52) U.S. Cl. .................... 198/831; 198/778
(58) Field of Classification Search .............. 198/778, 198/848, 849, 831, 850–853
See application file for complete search history.

(56) References Cited

U.S. PATENT DOCUMENTS 568,583 A 9/1896 Richards (Continued)

FOREIGN PATENT DOCUMENTS

EP 0 262 247 4/1988

(Continued)

*Primary Examiner*—James R Bidwell
(74) *Attorney, Agent, or Firm*—King & Schickli, PLLC

(57) ABSTRACT

In one aspect, a modular link conveyor chain including slats is capable of assuming a compressed and an expanded condition so as to permit side-flexing while moving along a forward run and a return run in an endless path. The chain is formed of links arranged in rows spaced apart in the conveying direction, the links of a first row including aligned apertures and the links of a second row including oversized apertures, such as slots, for aligning with the aligned apertures of the links in the first row. A first connector is associated with the corresponding apertures to interconnect the first and second rows of links. At least one elongated slat is mounted to the connector. The slat may be mounted for pivoting movement between a first position forming at least part of a conveying surface along the forward run, and a second position along the return run.

16 Claims, 12 Drawing Sheets

U.S. PATENT DOCUMENTS

| | | |
|---|---|---|
| 661,405 A | 11/1900 | Kain |
| 749,695 A | 1/1904 | Litchfield |
| 861,484 A | 7/1907 | Stewart |
| 880,091 A | 2/1908 | Paton |
| 1,024,073 A | 4/1912 | Hannam |
| 1,322,031 A | 11/1919 | Litchfield |
| 1,438,566 A | 12/1922 | Wiggins |
| 1,641,313 A | 9/1927 | Bonaparte |
| 1,768,534 A | 7/1930 | Aiken |
| 1,864,359 A | 6/1932 | Laughlin et al. |
| 1,907,649 A | 5/1933 | Marx |
| 2,228,998 A | 1/1941 | Birdseye |
| 2,602,345 A | 7/1952 | Braumiller |
| 2,695,095 A | 11/1954 | Anderson |
| 2,717,703 A | 9/1955 | Kull et al. |
| 2,867,163 A | 1/1959 | Bloom |
| 2,962,151 A | 11/1960 | Rutten |
| 3,012,653 A | 12/1961 | Schramm |
| 3,232,416 A | 2/1966 | Winter |
| 3,237,804 A | 3/1966 | Bardy et al. |
| 3,265,188 A | 8/1966 | Redden |
| 3,296,812 A | 1/1967 | Cloudy |
| 3,303,921 A | 2/1967 | Gore |
| 3,303,922 A | 2/1967 | Gore |
| 3,405,531 A | 10/1968 | Davis, Jr. et al. |
| 3,447,668 A | 6/1969 | Jernigan |
| 3,549,001 A | 12/1970 | Harper et al. |
| 3,584,471 A | 6/1971 | Powell |
| 3,664,482 A | 5/1972 | Kornylak |
| 3,688,518 A | 9/1972 | Goltsos |
| 3,815,727 A | 6/1974 | Hartwig |
| 3,854,575 A * | 12/1974 | Fraioli, Sr. .................. 198/831 |
| 3,857,476 A | 12/1974 | Heifetz et al. |
| 3,863,755 A | 2/1975 | Hartwig |
| 3,892,307 A | 7/1975 | Scholl |
| 3,901,377 A | 8/1975 | Euverard et al. |
| 3,952,540 A | 4/1976 | Okada et al. |
| 4,130,196 A | 12/1978 | Schwab |
| 4,194,616 A * | 3/1980 | Barthelemy et al. ......... 198/778 |
| 4,205,536 A | 6/1980 | Kasahara |
| 4,222,483 A * | 9/1980 | Wootton et al. ............. 198/831 |
| 4,329,850 A | 5/1982 | Drummond |
| 4,378,873 A | 4/1983 | Cloudy |
| 4,378,874 A | 4/1983 | Schwab |
| 4,421,227 A | 12/1983 | Kornylak |
| 4,446,159 A | 5/1984 | Roth |
| 4,530,214 A | 7/1985 | Ellsworth et al. |
| 4,600,596 A | 7/1986 | Gongwer et al. |
| 4,741,431 A | 5/1988 | Whitehead |
| 4,804,551 A | 2/1989 | Matthews et al. |
| 4,951,807 A * | 8/1990 | Roinestad et al. ........... 198/778 |
| 5,036,673 A | 8/1991 | Miller et al. |
| 5,141,099 A | 8/1992 | Baumgartner |
| 5,205,135 A | 4/1993 | Lang |
| 5,214,934 A | 6/1993 | Palframan et al. |
| 5,346,057 A * | 9/1994 | Fisher et al. ................ 198/778 |
| 5,421,168 A | 6/1995 | Reynolds |
| 5,444,985 A | 8/1995 | Lang et al. |
| 5,460,015 A | 10/1995 | Venetucci |
| 5,460,260 A | 10/1995 | Ochs et al. |
| 5,467,612 A | 11/1995 | Venetucci |
| 5,487,908 A | 1/1996 | Appolonia et al. |
| 5,520,012 A | 5/1996 | Strong et al. |
| 5,520,013 A | 5/1996 | Kuo |
| 5,522,227 A | 6/1996 | Appolonia |
| 5,533,343 A | 7/1996 | Moshier et al. |
| 5,551,251 A | 9/1996 | Ochs et al. |
| 5,662,208 A | 9/1997 | Drewitz |
| 5,881,561 A | 3/1999 | Viard |
| 6,070,712 A | 6/2000 | Baez |
| 6,148,618 A | 11/2000 | Malmberg et al. |
| 6,216,470 B1 | 4/2001 | Kosock et al. |
| 6,216,472 B1 | 4/2001 | Cathenaut |
| 6,318,111 B1 | 11/2001 | Murakami et al. |
| 6,334,330 B2 | 1/2002 | Lang et al. |
| 6,370,886 B1 | 4/2002 | Ochs |
| 6,393,859 B1 | 5/2002 | Olsson et al. |
| 6,615,979 B2 | 9/2003 | Etherington et al. |
| 6,640,576 B2 | 11/2003 | Berghoff et al. |
| 6,675,589 B1 | 1/2004 | Howard |
| 6,825,446 B1 | 11/2004 | Amarson et al. |
| 6,912,869 B2 | 7/2005 | Lang |
| 6,976,369 B2 | 12/2005 | Nothum, Jr. |
| 2004/0020749 A1 | 2/2004 | Wood et al. |
| 2004/0216470 A1 | 11/2004 | Thomas et al. |
| 2005/0126895 A1 | 6/2005 | Layne et al. |
| 2005/0241332 A1 | 11/2005 | Kamm |
| 2006/0070393 A1 | 4/2006 | Muscato et al. |
| 2006/0090497 A1 | 5/2006 | Ishikura et al. |
| 2006/0196194 A1 | 9/2006 | Bruggeman et al. |

FOREIGN PATENT DOCUMENTS

| | | |
|---|---|---|
| EP | 0 451 346 | 10/1991 |
| GB | 765760 | 1/1957 |

* cited by examiner

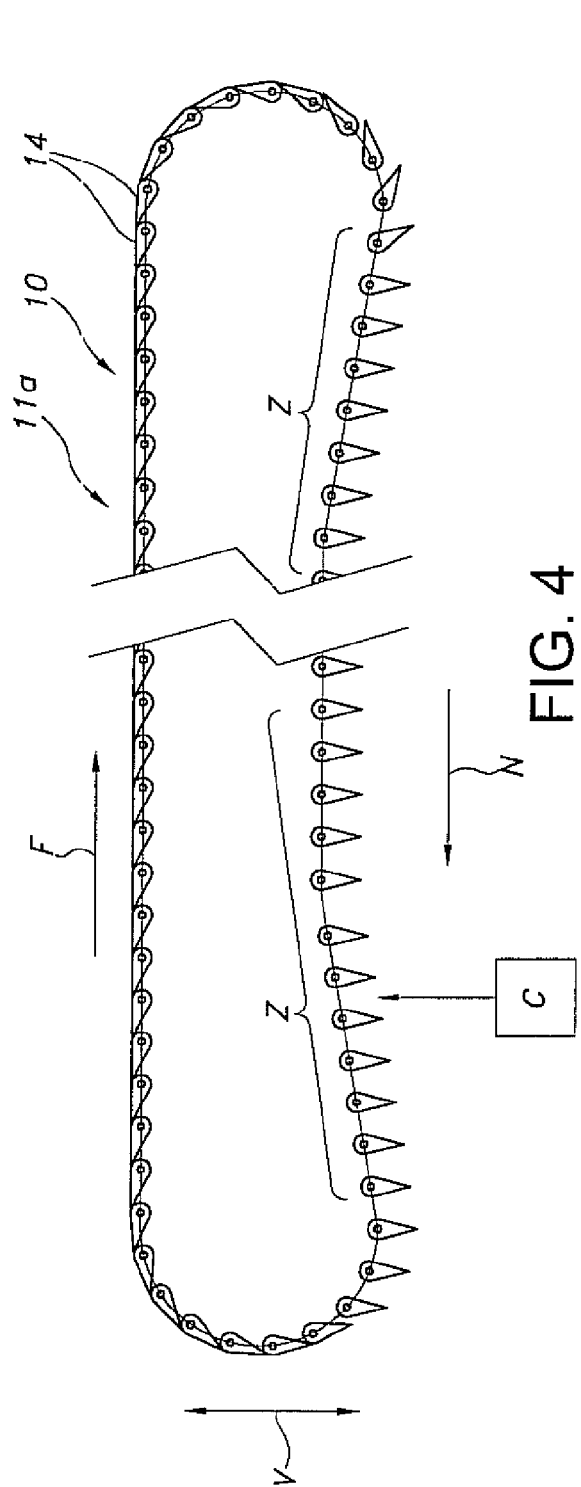
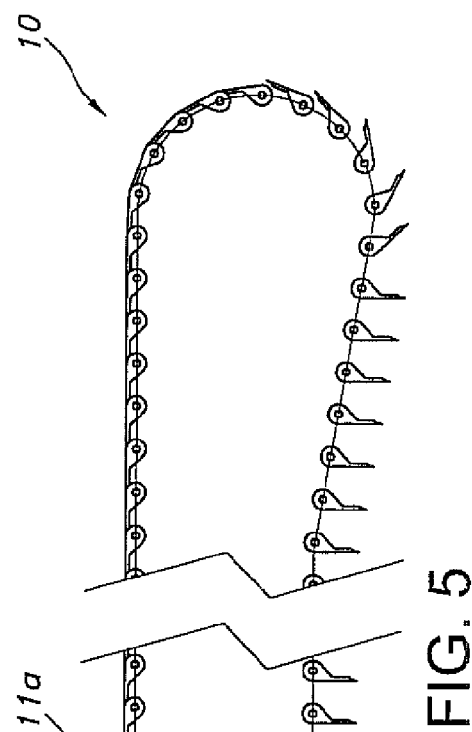
FIG. 4
FIG. 5

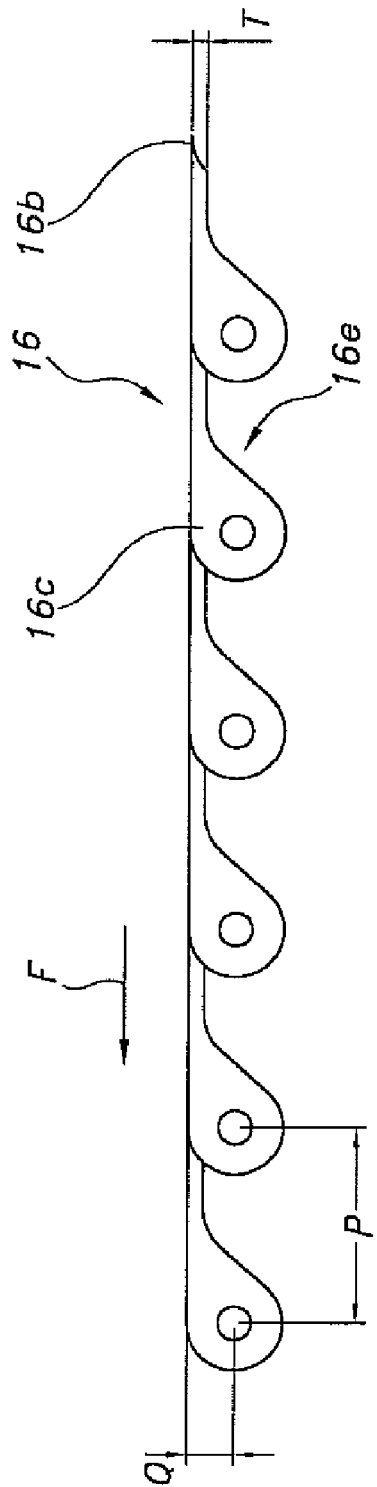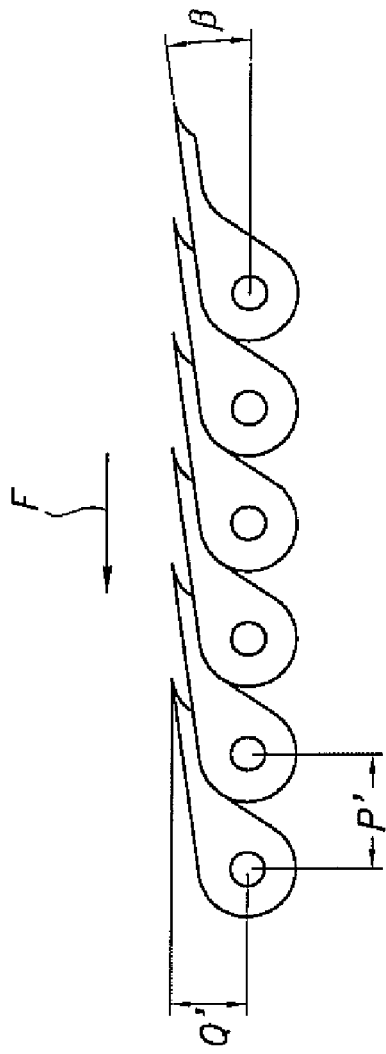
FIG. 6
FIG. 6A

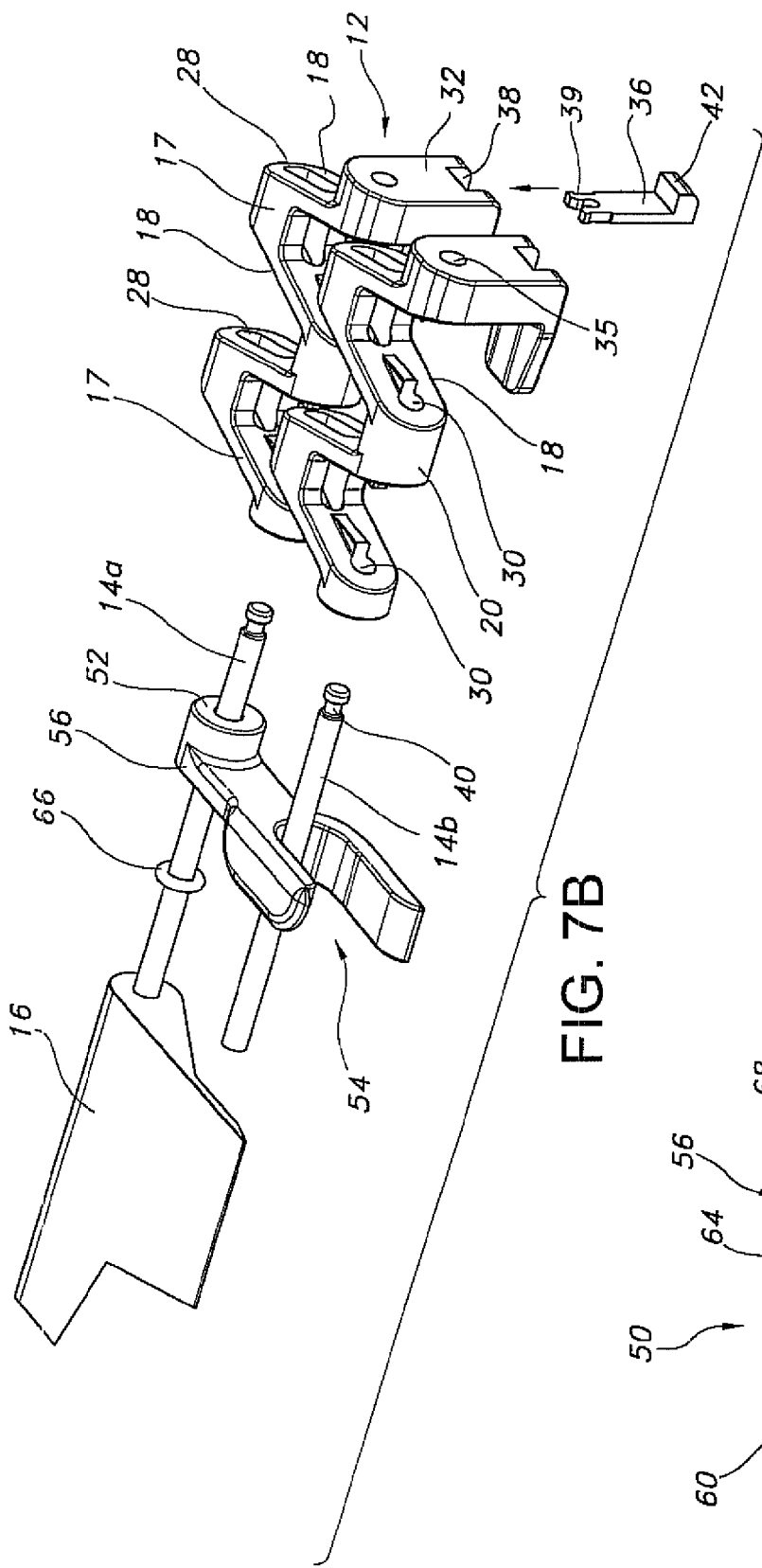
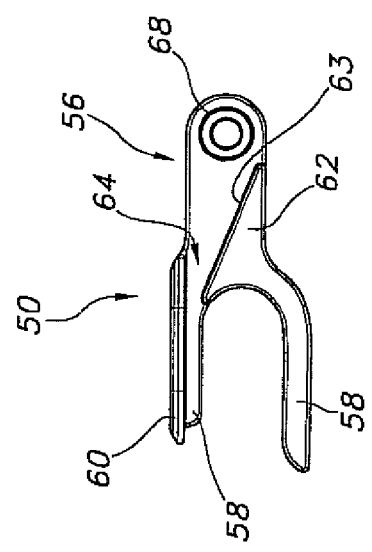
FIG. 7B
FIG. 7C

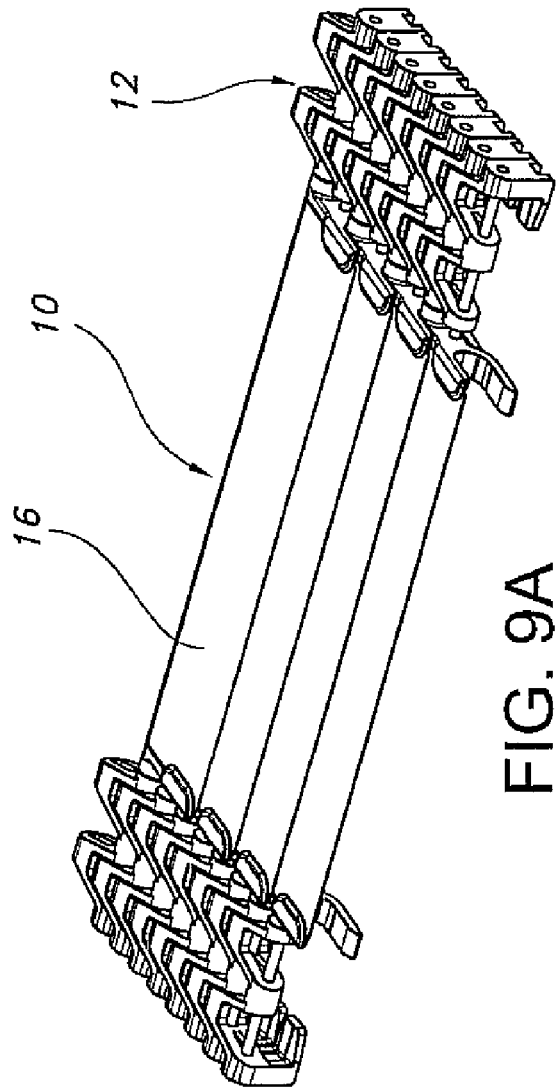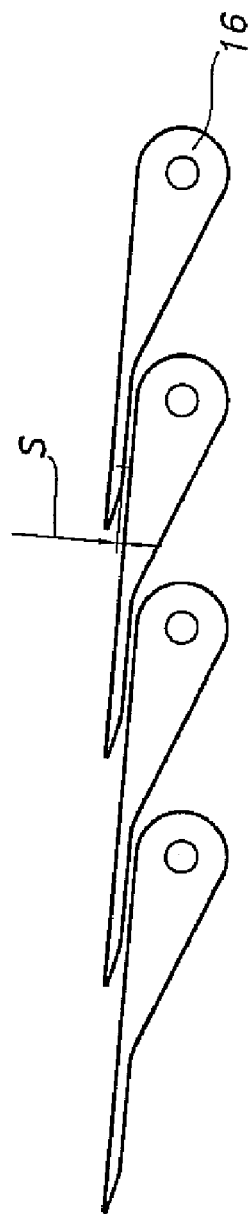
FIG. 9A
FIG. 9B

SIDE-FLEXING CONVEYOR CHAIN WITH PIVOTING SLATS AND RELATED METHODS

This application claims the benefit of U.S. Provisional Patent Application Ser. No. 60/802,898, filed May 24, 2006, the disclosure of which is incorporated herein by reference.

TECHNICAL FIELD

The present invention relates generally to the conveyor art and, more particularly, to a side-flexing conveyor chain incorporating pivoting elongated slats and related methods.

BACKGROUND OF THE INVENTION

Conveyor systems form an integral part of modern production facilities. Such systems are especially beneficial in the food processing and article packaging industries, where it is often desirable to move articles to and from different areas of the production facility to undergo various manufacturing/packaging operations. For example, many food manufactures require transportation of food items from a baking area to a position for final packaging. However, many of these items, such as breads and other baked goods require cooling prior to packaging. Additionally, these food products are often soft and fragile, thereby requiring special care during transportation through the production facility to avoid damage.

In this regard, conveyor chains with rows of laterally repeating modular links forming the conveying surface are perhaps the most popular on the market today. Such a conveying surface does not, however, maximize the amount of thermal transfer to the underside of the articles being conveyed. This can be deleterious for cooling items during conveyance, such as baked goods or frozen foods being packaged at a downstream location. Soft goods also tend to conform to the conveying surface, if interrupted, which can lead to unwanted vestiges.

Another limitation with prior art chains with laterally repeating links is the creation of multiple crevasses and recesses in which debris and residue can become lodged. Despite the existence of various types of belt or chain "washers," it remains difficult to ensure that the cleaning is as thorough as possible in view of the large number of open spaces in the conveying surface of a typical modular link chain. Such thorough cleaning may be crucial in certain situations (such as food processing), but may also contribute substantially to the operating expense.

Additionally, many production facilities also have limited floor space, thereby making efficient use of the space available imperative. Thus, manufacturers are increasingly desirous of conveyor systems occupying as small an area as possible. To do so, the conveyor chain must have the capability to move product smoothly around curves (including along a helical or spiral path), as well as along extended runs.

In the past, others have proposed linear conveyors incorporating slats, such as for use in applications involving the freezing of products. An early example is found in U.S. Pat. No. 3,447,668 to Jernigan, which discloses an endless conveyor formed of a plurality of thermally conductive (metal) elements designed to form a substantially planar conveying surface along the forward run. Along the return run, the elements pivot to a generally vertical position. This allows the thermal media (cold air) to reach the underside of the elements of the forward run and facilitate cooling of the articles being conveyed via the conductive element.

While this approach is advantageous in certain respects, it is not without significant limitations. For one, the conveyor is incapable of side flexing and, thus, can only assume a linear condition. This greatly limits its usefulness (including in connection with spiral-type freeze conveyors). Another limitation is that the elements are in direct contact along the forward run, and are thus subject to frictional wear. The free, uncontrolled pivoting of the elements may also render them susceptible to reaching undesirable positions and becoming "caught up" with adjacent elements.

Accordingly, a need is identified for a conveyor chain with a conveying surface capable of providing full, even support for any articles being conveyed, including smaller ones that might normally pass through or become caught within an open conveying surface. The conveyor chain would also be easy to clean and capable of negotiating turns or bends, thus potentially creating a savings in the amount of floor space occupied in the production facility. Overall, a substantial improvement in terms of efficiency and operator satisfaction would result, especially when used in conveying food products or other articles to be cooled during conveyance.

SUMMARY OF THE INVENTION

In accordance with one aspect of the invention, a modular link conveyor chain with at least one elongated slat is capable of assuming a compressed and an expanded condition as the result of side-flexing, and moving along a forward run and a return run in an endless path (which may be partially spiral). The chain comprises a plurality of links arranged in rows spaced apart in a conveying direction. The links in at least a first row include first aligned apertures and the links in at least a second row including second, oversized apertures for aligning with the aligned fast apertures of the links in the first row. A first connector associated with the first and second apertures interconnects the first and second rows of links. The at least one elongated slat is mounted to the connector for movement between a first position forming at least part of a conveying surface along the forward run and a second position along the return run.

In one embodiment, a connector is associated with each of a plurality of rows of adjacent links, and a slat associates with two or more of the connectors (such as every other one). Preferably, in such configuration, the slats are capable of nesting at least partially within each other in the compressed condition of the chain. In any case, the plurality of slats maintain the substantially continuous conveying surface, including when the chain undergoes side-flexing. However, to avoid frictional contact among the slats during side-flexing, it is preferable to maintain a gap between adjacent slats, including along the return run. A spacer may be provided to help maintain this desirable gap.

In one particularly preferred embodiment, each row of links includes at least two side links. Each side link is characterized by the inclusion of a depending arm. The depending arm carries an inwardly projecting tab, which may be used for engaging a guide rail or like structure for guiding and supporting the chain as it traverses the endless path.

In accordance with another aspect of the invention, a modular link conveyor chain with slats is capable assuming a compressed and an expanded condition and moving along a forward run and a return run in an endless path. The chain comprises a plurality of links arranged in rows spaced apart in a conveying direction. The links include first apertures and second oversized apertures for aligning with the first apertures of adjacent links. A plurality of connectors associate with the first and second apertures. A slat is pivotally mounted to the connector, such that adjacent slats overlap at least along the forward run when the chain is in the compressed condition.

Preferably, a spacer is provided for preventing adjacent slats from directly contacting each other when the chain is in the compressed condition. This is done to avoid direct frictional contact among and reduce wear on the slats. Most preferably, the spacer comprises a receiver for receiving a first side of the slat. One of the connectors may carry the receiver and, ideally, a first receiver is supported by a first connector and a second, adjacent receiver is supported by a second connector. In use, the first receiver engages the second receiver when the chain is at least partially in the compressed condition.

In accordance with yet another aspect of the invention, a modular link conveyor chain capable of side flexing and moving along a forward run and a return run in an endless path incorporates slats. The chain comprises a plurality of links arranged in rows spaced apart in a conveying direction, the links in at least a first row including first apertures and the links in at least a second row including second, oversized apertures for aligning with the first apertures when interdigitated with the links in the first row. A connector associates with each of the first and second apertures in the first and second rows of links. A slat is mounted to each connector so as to be capable of at least partially nesting with the next-adjacent slat when the chain side-flexes or undergoes longitudinal compression. Preferably, the chain further includes a spacer for preventing adjacent slats from directly contacting each other in the compressed condition in order to avoid direct frictional contact among and reduce wear on the slats.

According to still a further aspect of the invention, a method of manufacturing a conveyor belt is disclosed. The method comprises interconnecting a plurality of links arranged in rows spaced apart in the conveying direction so as to form a side flexing chain. The method further comprises mounting at least one elongated slat to the links for pivoting movement between a first position and forming at least part of a conveying surface along the forward run, and a second position along the return run.

Yet a further aspect of the invention is a method of operating a conveyor chain including a plurality of pivoting slats. The method comprises moving the conveyor chain along a forward run with each slat spaced from and at least partially overlapping with an adjacent slat to form a substantially continuous conveying surface.

In one particular embodiment, the method further comprises moving the conveyor chain to an expanded condition. The method may further include the step of contacting one slat with an adjacent slat in the expanded condition. The moving step along the forward run may comprise driving the conveyor chain along a curve such that the slats overlap to a greater extent along the inside of the curve than the outside of the curve.

BRIEF DESCRIPTION OF THE DRAWINGS

FIGS. 4 and 5 are side schematic views showing one possible manner in which the slats may pivot as the conveyor chain traverses an endless path including a forward and a return run;

FIGS. 6 and 6a are views similar to FIGS. 3 and 3a, but in which the slats have a different cross-sectional shape or profile;

FIGS. 7a, 7b, and 7c illustrate another embodiment of a side flexing conveyor chain with slats forming another aspect of the invention;

FIGS. 9a, 9b-9E show the chain of FIGS. 7a-7c in a compressed condition along a forward or non-inverted run;

DETAILED DESCRIPTION OF THE INVENTION

Figure 1:
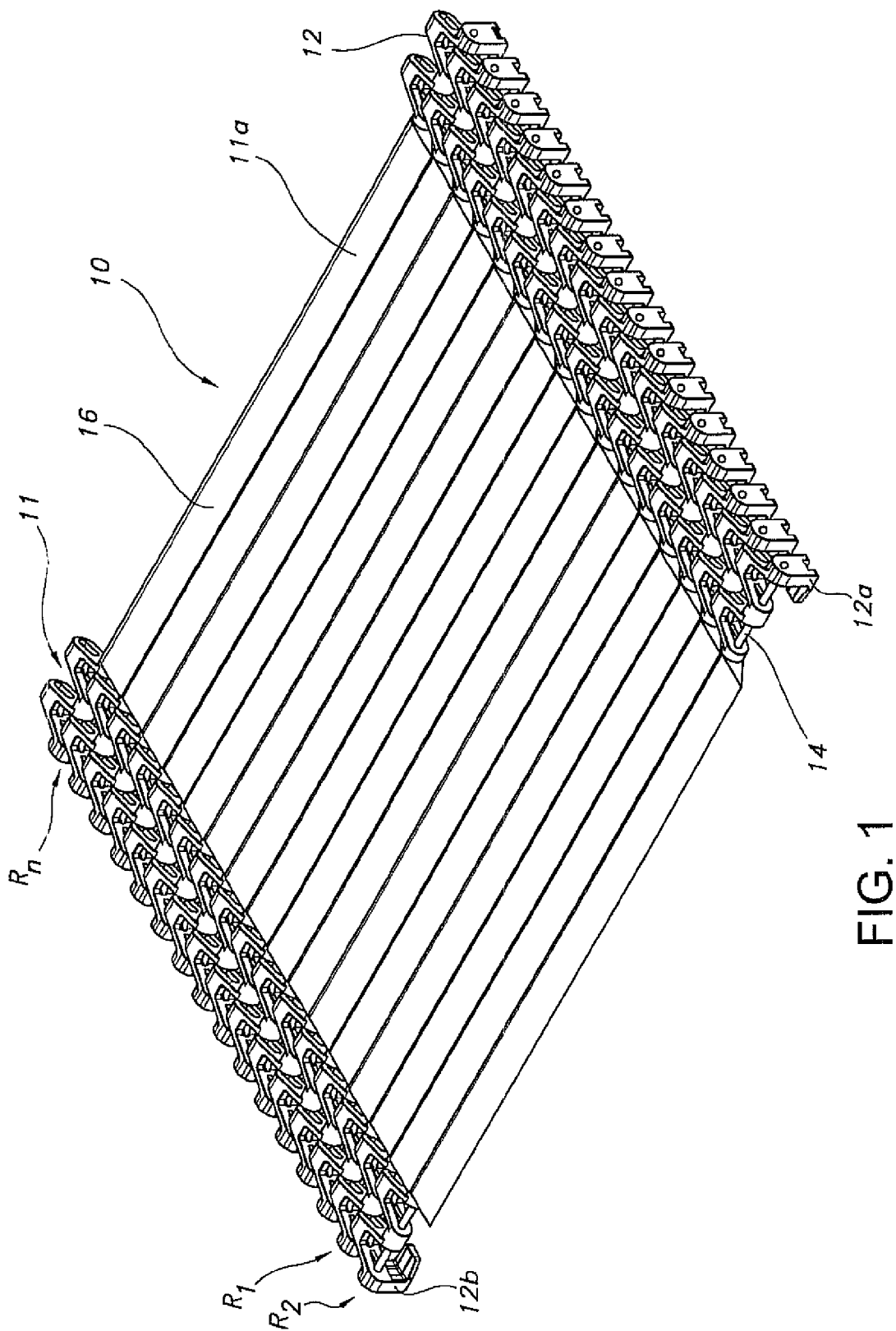
FIG. 1 is a perspective view of a side flexing conveyor chain with slats forming one aspect of the invention.

Reference is now made to FIG. 1, which depicts a conveyor belt or chain 10 including a conveying surface 11 for engaging and supporting articles. In this particular embodiment, the chain 10 comprises modular links in the form of side guide links 12 arranged in spaced apart rows $R_1 \ldots R_n$, which thus partially create the conveying surface 11. As should be appreciated, the chain 10 may form part of an overall conveyor system, which may include guide rails for guiding the chain as well as a drive system incorporating a sprocket or roller for driving the chain. In such a system, the chain 10 may be driven along an endless path between a forward run F and a return run N, which may be vertically offset or otherwise.

Figure 7A:
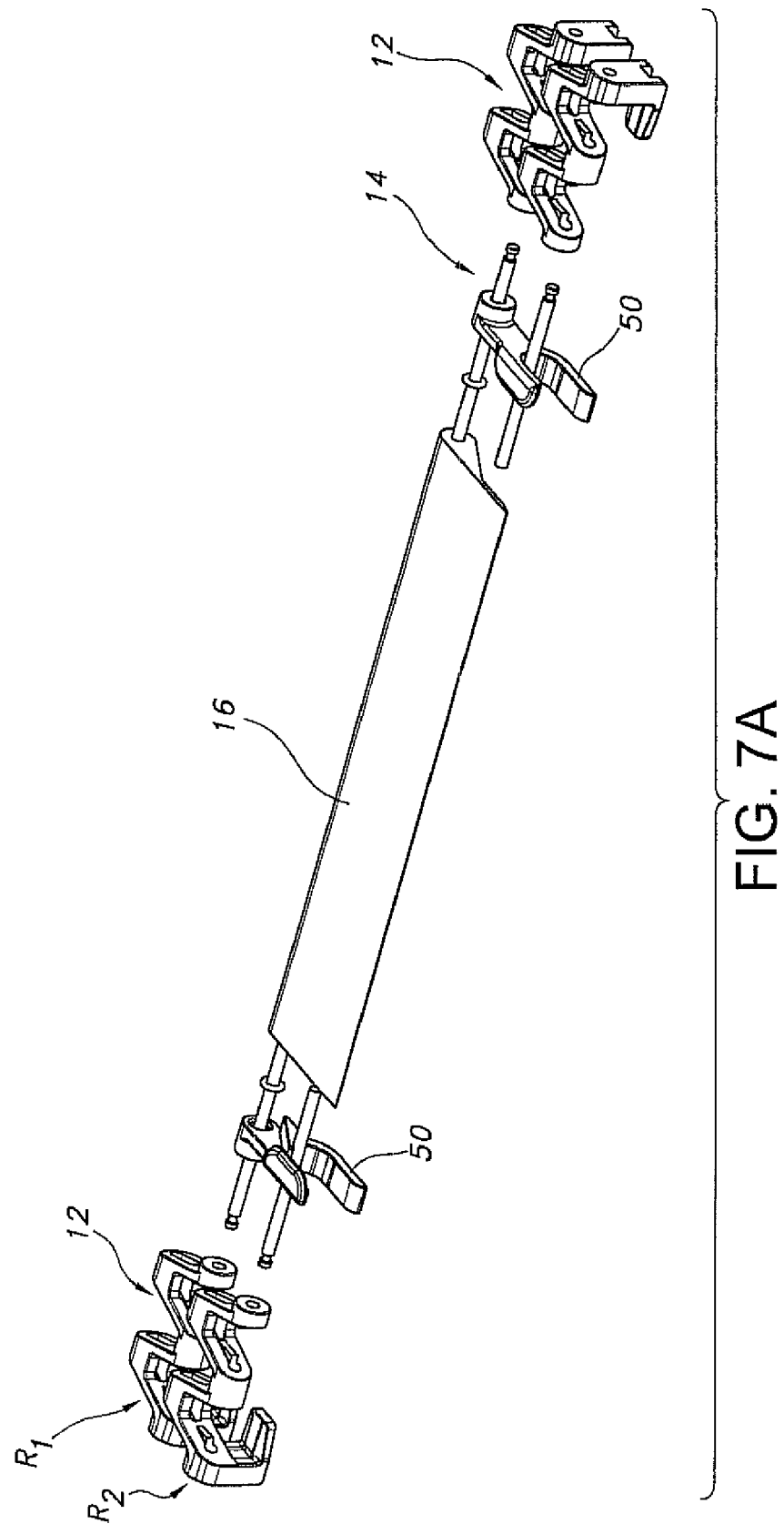

Adjacent rows $R_1$, $R_2$ of the side links 12 interconnect via transversely extending connectors 14, which are also referred to in the vernacular as "cross rods," "hinge pins," etc. Specifically, as shown in FIGS. 1, 7a, and 7b, each side link 12 includes a plurality of laterally repeating sections, each having an apex portion 17. A pair of leg portions 18 extend or project from each apex portion 17, preferably in an outwardly diverging relationship. Consequently, a single laterally repeating section of the link 12 in this embodiment is substantially V-shaped in plan view, which of course means that a pair of the sections are substantially W-shaped. As should be appreciated, the upper surfaces of the apex portion 17 and leg portions 18 are adapted for engaging and supporting articles for conveyance.

Each leg portion 18 is also associated with a foot portion 20. The foot portion 20 is typically barrel shaped, and may include an upper surface defining a surface capable of engaging and conveying articles. In the usual arrangement, and although a chain 10 formed of links 12 of this type is fully reversible, the apex portions 17 define the leading end of the link 12 and the foot portions 20 define the trailing end. In other words, the chain 10 may be normally driven in either direction along an endless path in the course of conveying articles in the desired manner.

Each apex portion 17 provided in the link 12 includes a first opening or aperture oversized relative to the connector 14, which may be in the form of an elongated slot 28. Furthermore, the foot portion 20 of each leg portion 18 includes a second opening or aperture, such as a hole 30. The holes 30 of adjacent foot portions 20 are thus coaxial, as are the slots 28 when multiple apex portions 17 are provided.

As is shown in FIGS. 7a and 7b, when two links 12 spaced in the conveying direction along each side of the chain 10 are interdigitated, the connector 14 passes through the slot 28 in each apex portion 17 and the hole 30 in each foot portion 20. Consequently, the links 12 in adjacent rows $R_1$, $R_2$ are interconnected with each other, but capable of relative movement. As discussed further below, the longitudinal freedom of the connector 14 in the slot 28 is desirable, since it allows relative movement among the rows $R_1$, $R_2$ of links 12 to take place and permits the chain to side flex as well as to expand and compress.

To hold the first connector 11 in this position, it is retained in the outer side portion of each link 12. In one embodiment, as shown in FIG. 7b, this is accomplished by providing the outermost foot portion, or side portion 24, of each link 12 with a depending arm portion 32 having a hole 35 co-axial with the hole 30 of each foot portion 20. The hole 35 receives the first connector 14, and an integral locking tab 36 is inserted within a slot 38 formed in the link 12. The locking tab 36 may include prongs 39 to engage a corresponding circumferential notch 40 provided at each end of the first connector 14. In the preferred embodiment, the locking tab 36 is fabricated from a resilient or flexible material, such as nylon. This construction allows the prongs 39 of the tab 36 to snap lock in the notch 40 for secure engagement and further allows the locking tab 36 to be easily installed and removed.

The locking tab 36 also includes an offset release button 42 seated in an open-ended portion of the slot 38. The button 42 assists in the installation and removal of the locking tab 36 from the side when, for example, maintenance and repair is required. More specifically, a blade tool, such as a screwdriver, is tapped against the button to initiate prying action. Once sufficient movement is initiated, the screwdriver then provides increased leverage to facilitate removal of the tab 36. The inherent resiliency of the tab 36 allows the prongs 39 to disengage from the notch 40. To reinsert the tab 36, the prongs 39 are directed into the slot 38. It can be appreciated that the resiliency of the tab 36 allows the prongs 39 to snap around the notch 40. Thus, secure retention of the connector 14 results.

In accordance with one aspect of the invention, an elongated slat 16 may be pivotally mounted to each transverse connector 14. Preferably, each slat 16 is formed from a single piece of material (such as by extrusion) and includes a channel, bore or opening 16a extending in a direction transverse to the conveying direction for receiving the connector 14. This opening 16a is preferably slightly oversized relative to the outer diameter of the connector 14. As a result, the opening 16a slidably receives the connector 14 while it retains the capability of undergoing free pivoting movement about a transverse axis.

Figure 2:
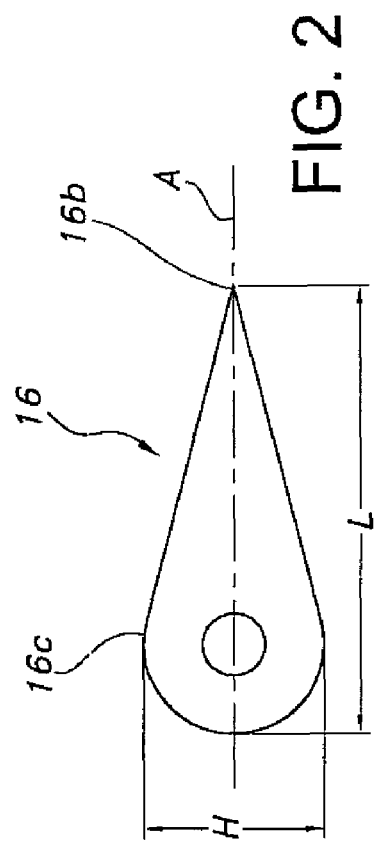
FIG. 2 is a schematic side view of a slat for possible use with the conveyor chain of FIG. 1.
Figure 3:
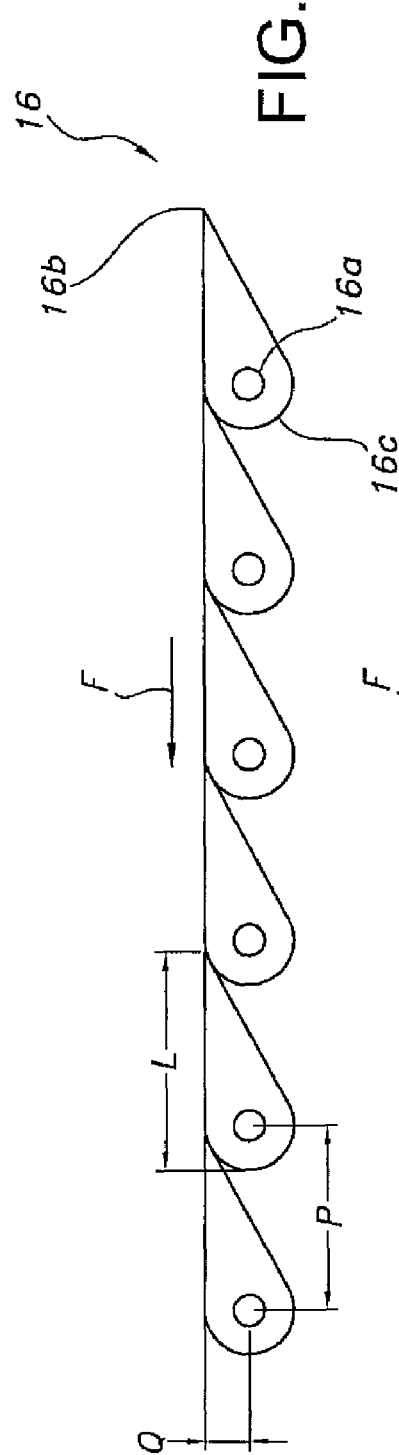
FIG. 3 is a schematic side view of a plurality of slats for possible use with the conveyor chain of FIG. 1, and illustrates when the chain is in a non-compressed or extended condition.

As perhaps best shown in FIGS. 2 and 3, each slat 16 is preferably provided with a taper along each side so as to form a first, generally narrow end 16b and a second, generally wider end 16c (note the height dimension H). The taper may be mutual, thus giving the slat 16 general symmetry about a longitudinal axis A and the appearance of a teardrop when viewed in profile or cross-section. The slats 16 are also provided with a length L in the longitudinal direction (see FIG. 2) such that at least along the forward run F, the narrow end 16b each preceding slat 16 overlies the second end 16c of the succeeding slat. Stated another way, the maximum pitch P of adjacent transverse connectors 14 is preferably equal to or less than the length L of each slat 16 (see FIG. 3).

Turning to FIG. 3, each slat 16 in use thus includes a conveying face 16d for partially defining a corresponding interior portion 11a of the conveying surface 11. The spacing Q from a generally horizontal plane extending through the opening 16a in the slat 16 along the second end 16c for receiving the connector 14 (which thus defines a bi-directional pivot point) to the conveying face 16d in the "home" or generally horizontal position is such that the entire interior portion 11a of the conveying surface 11 is generally planar. In other words, there is no or negligible "skew" among adjacent slats 16 when overlapped in the normal or "home" position, which of course helps to provide full, reliable article support during conveyance. As a result of this arrangement, and as perhaps best shown in FIG. 3, the slats 16 together form the substantially continuous interior portion 11a of the conveying surface 11. The overlapping nature of the slats 16 means that this portion 11a of the conveying surface 11 is substantially continuous and free of gaps or openings, and is thus well-suited for providing full, even support, including for the smallest of articles. Moreover, the slats 16 both individually and collectively provide a large surface area for improved thermal transfer to or from the articles being conveyed.

In contrast, when the slats 16 transition to the return run N, such as at the ends of the conveying path, the free pivoting movement allows the slats 16 to pivot and assume a generally vertical orientation (note action arrow V). As should be appreciated from FIG. 4, the slats 16 in this orientation are not overlapping or otherwise in contact. When spaced apart in this fashion, the conveying surfaces 16d of the slats 16 are thus more easily cleaned, as is the exposed underside of the slats along the forward run F. The return run N with the slats 16 in this non-overlapping or spaced apart condition thus defines a cleaning "zone" Z.

Cleaning may be effected in any manner desired, with a preference for the more efficient automatic sprayer for spraying a cleaning fluid (air, water, etc., with or without sanitizing agents) over the now fully exposed surfaces of the slat 16. Alternatively, a cleaner in the form of a fluid bath into which the slats 16 are introduced may be provided. In any case, cleaning most preferably occurs along the return run N (note block C in FIG. 4) and within the cleaning zone Z.

The substantially uninterrupted, continuous nature of the slat 16 further serves as a significant advantage in terms of cleaning, as compared to prior art approaches with interdigitated rows formed solely of individual links. Indeed, it may be the case that cleaning is not required as frequently as a result of this type of arrangement in view of the lack of crevasses or recesses in at least the interior portion 11a of the conveying surface 11.

As a result of the free pivoting movement, it should also be appreciated that the slats 16 automatically return to the overlapping condition during the transition from the return run N to the forward run F. The substantially continuous interior portion 11a of the conveying surface 11 is thus automatically re-established, ready for receiving any articles to be conveyed as the chain 10 moves along the forward run F. As should be appreciated, this cycle automatically repeats itself as the chain 10 moves along the endless conveying path between the forward run F and the return run N.

Figure 3A:
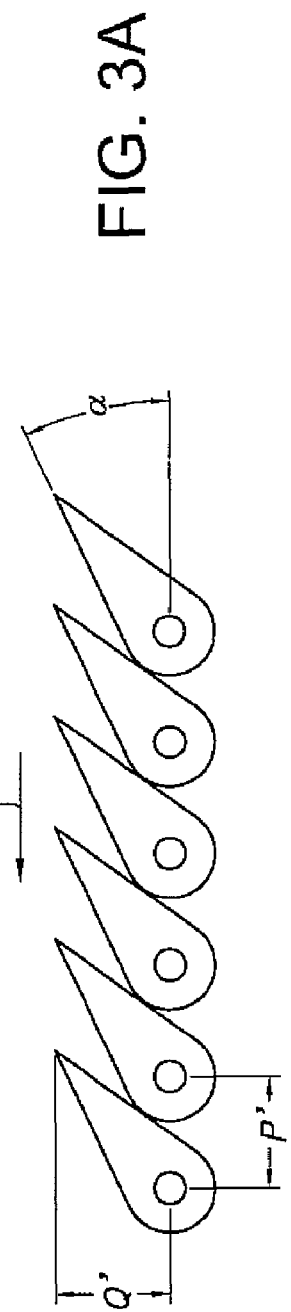
FIG. 3a is a view similar to FIG. 3, but illustrates what happens when the corresponding chain is compressed.

The chain 10 as described above includes side-flexing capability, as well as the ability to compress and expand in the longitudinal direction. Aside from eliminating the deleterious catenary approach prevalent in prior art conveying systems, when used in connection with the slats 16, this allows the chain 10 to negotiate curves. Specifically, in moving along a curve or compressing longitudinally, the slats 16 in view of their overlapping nature along the forward run F tend to either partially or fully pivot away from the plane of the conveying surface 11. The connectors 14 thus assume a reduced pitch P' while the slats 16 have a greater center-to-tip spacing Q', or "skew," at least along the corresponding side or face 16d (see FIG. 3a). Moreover, this may form a relatively large "skew" angle α (approx. 25° in the illustrated embodiment) between a generally horizontal plane aligned with the opening 16a in the slat 16 and the plane of the conveying face 16d. As a result, the slats 16 become "bunched up," but may still form a generally continuous portion 11b of the conveying surface 11. As should be appreciated, when negotiating curves, the slats 16 assume the position shown in FIG. 3a along the inside edge of the curve, but may remain spaced as shown in FIG. 3 along the outside of the curve.

In the illustrated embodiment, the difference between the center-to-tip distance Q in the vertical direction when the slats 16 are collapsed as shown in FIG. 3 (skew approximately zero) and the augmented distance Q' shown in FIG. 3b (non-zero skew) can be significant. To reduce the skew resulting from side-flexing, and as perhaps best understood with reference to FIGS. 5, 6, and 6a, it is possible to provide each slat 16 with a generally thin, flat first end 16b (note dimension T in FIG. 6, and compare with dimension H in FIG. 2). This thin, flat end 16b also defines a recess 16e in the underside of each slat 16, and gives each slat an asymmetrical, "whistle"-shaped profile or cross-section.

Consequently, adjacent slats 16 may nest together and collapse in an orderly fashion while overlapping during longitudinal compression or side flexing of the chain 10. As can be appreciated from comparing FIGS. 6 and 6a, there is much less difference between the center-to-surface spacing (Q vs. Q') or skew, and the corresponding angle (α vs. β) with such slats 16. However, the operation of the chain 10 when transitioning between the forward and return runs F, N is not compromised in any way, as shown in FIG. 5.

Yet another aspect of the invention is described with reference to FIGS. 7-9. Specifically, the illustrated embodiment of the chain 10 incorporates a spacer designed to maintain a space between the adjacent slats 16 while simultaneously controlling the relative position thereof. In the illustrated embodiment, with reference to FIGS. 7a and 7b, the spacer takes the form of a receiver 50 for associating with every other connector 14 along each side of the chain 10 and adapted for receiving one end of each slat 16. It should be further appreciated that one slat 16 is associated with every other connector 14 in the conveying direction (which further means that the connectors 14 not associated with slats 16 need not extend the full transverse width of the chain 10, but instead may extend from the outer side to the inner side of the side link 12 without in any way compromising performance).

In the illustrated embodiment, each receiver 50 includes a first end with an aperture 52 for receiving a first one of the connectors 14a. The opposite end of the receiver 50 forms a yoke 54 for receiving a second, adjacent one of the connectors 14b. An arm 56 connects the ends of the receiver 50.

With reference to FIGS. 7a, 7b and 7c, it can be seen that the yoke 54 comprises generally elongated, spaced fingers 58 forming a U-shaped recess. One of the fingers 58 (the upper one in the illustration) supports a projecting plate-like portion 60 having an upper surface generally parallel to the upper surface of each slat 16. A projecting sidewall 62 with a generally planar, linearly sloping surface 63 is provided adjacent the arm 56. Together, the sloping surface 63 of the sidewall 62 and the underside of the plate-like portion 60 form a channel 64 for receiving and capturing one side of the slat 16, with the side face thereof generally in abutment with the matching side face of the arm 56.

Figure 8A:
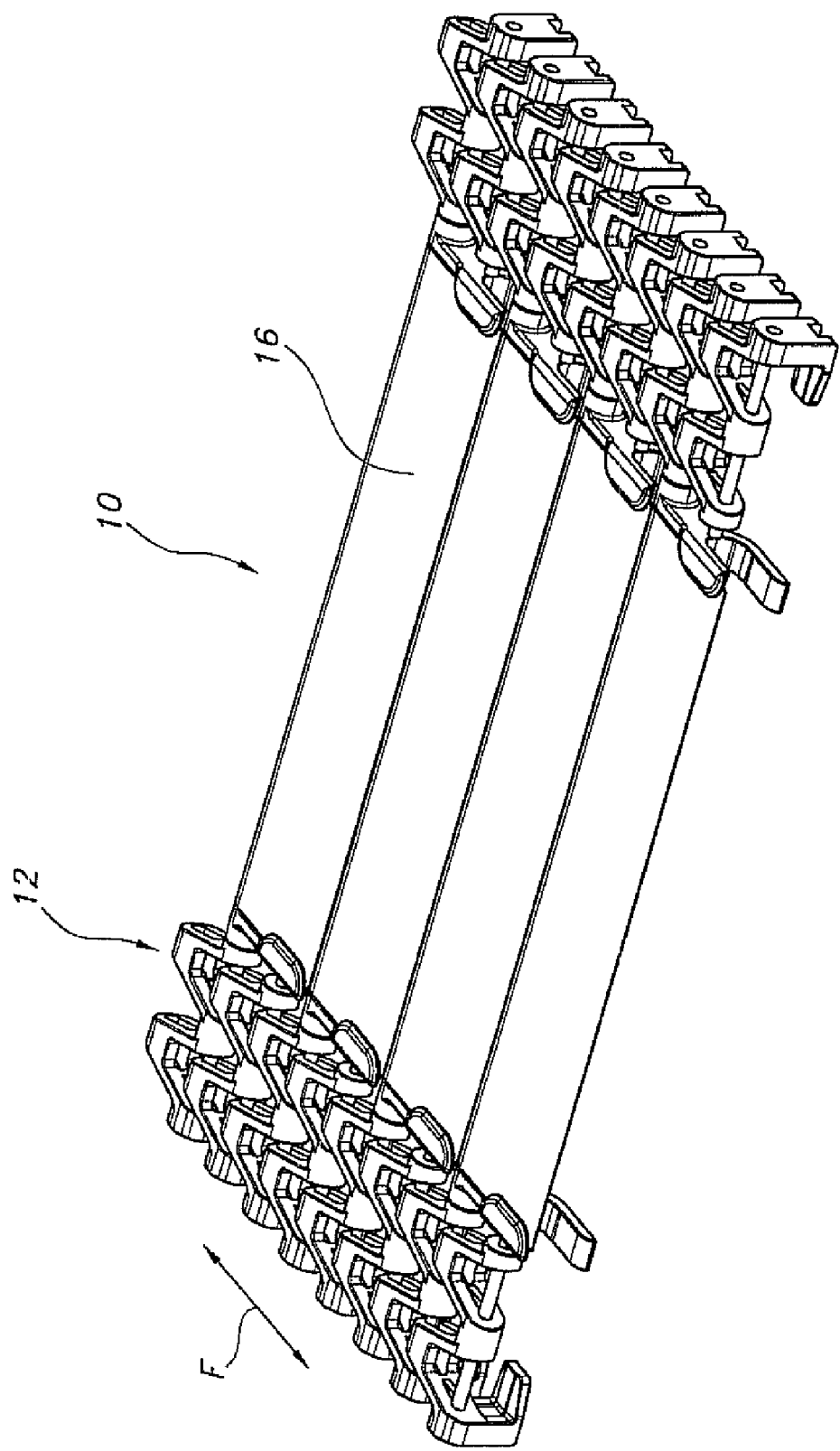
FIGS. 8a, 8b and 8c show the chain of FIGS. 7a-7c in a non-compressed condition along a forward or non-inverted run.
Figure 8B:
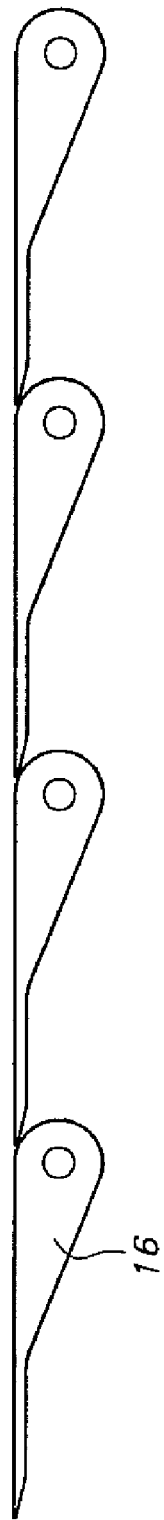
Figure 8C:
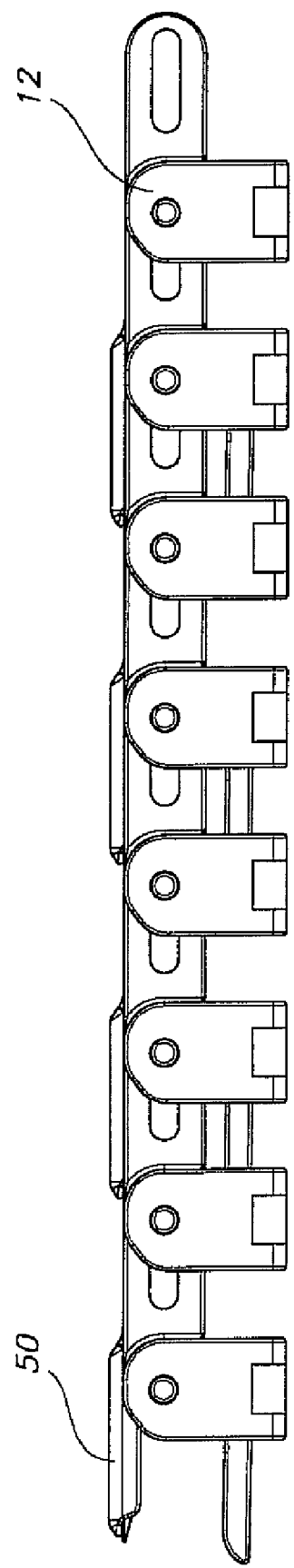

With reference now to FIGS. 8a, 8b, and 8c, the operation of the chain 10 of this embodiment can be better understood. Along the forward run F when the slats 16 are in a non-compressed or non-side flexing state, the receivers 50 are generally spaced apart from each other or otherwise not in intimate contact. Consequently, the adjacent slats 16 make only limited contact along a front end and a rear portion, respectively. The desirable substantially planar conveying surface 11a is thus maintained.

Figure 9C:
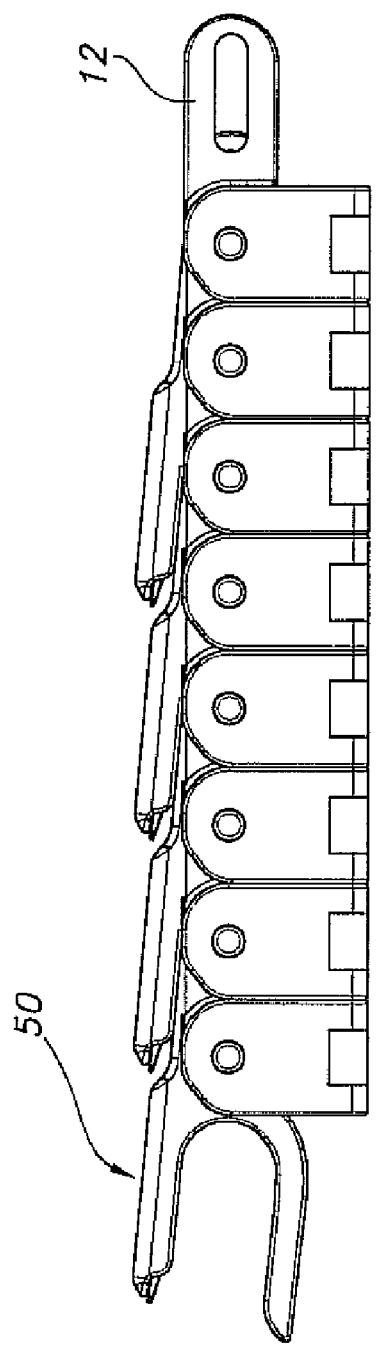
Figure 9E:
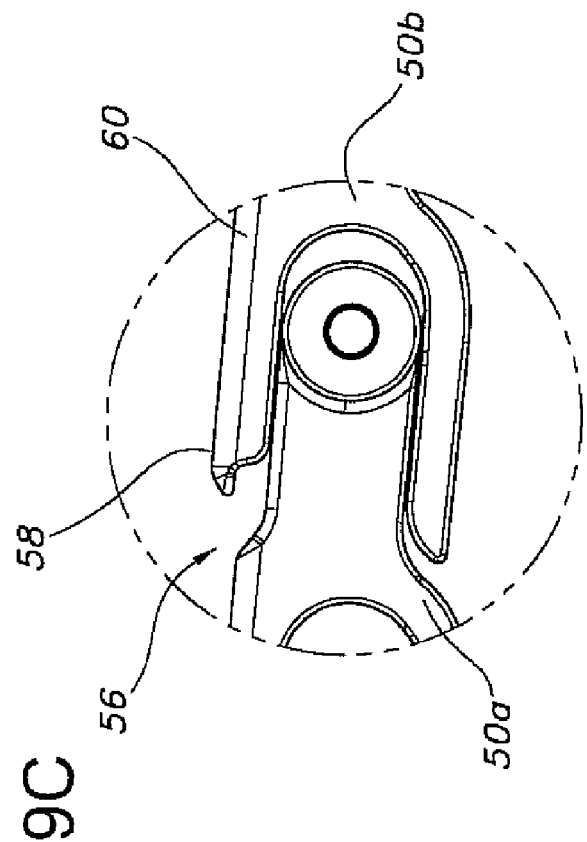
Figure 9D:
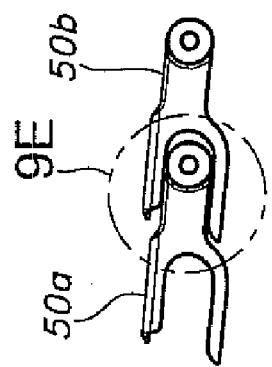
Figure 10C:
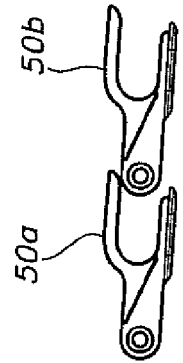
FIGS. 10a, 10b, and 10c show the chain of FIGS. 7a-7c in a non-compressed condition along a return or inverted run.
Figure 10A:
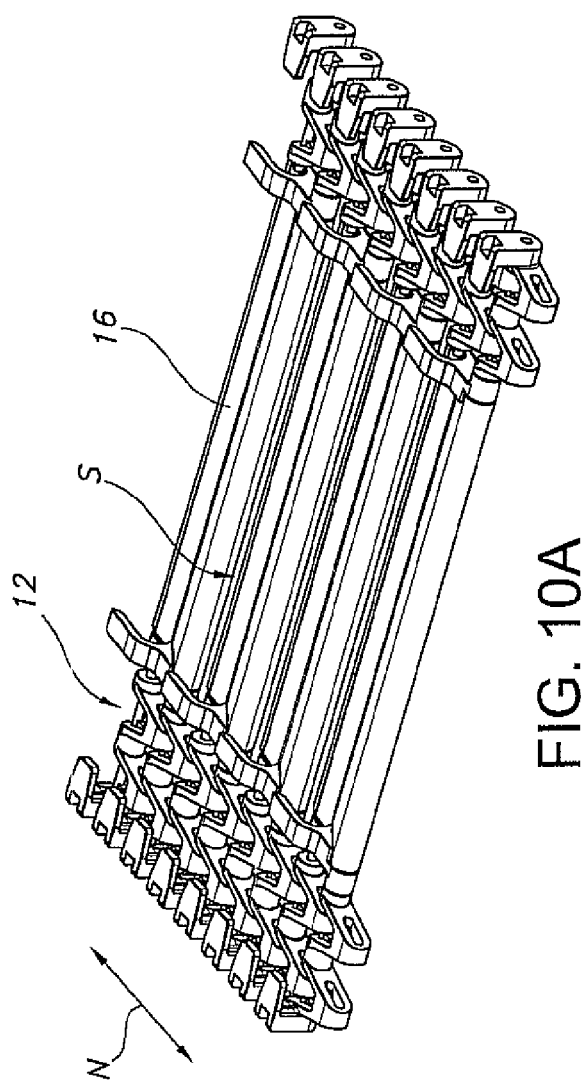
Figure 10B:
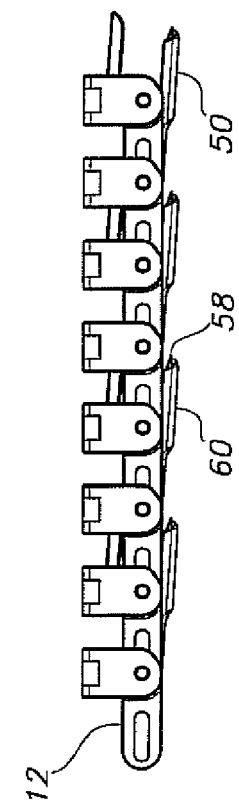

In contrast, and with reference to FIGS. 9a-9e, adjacent receivers 50 interdigitate when the chain 10 compresses, such as during side flexing or longitudinal compression (FIGS. 9a and 9b). The manner in which one receiver 50a may receive the adjacent receiver 50b is shown in FIGS. 9d and 9e. Along the forward run F, this results in the underside of the portion of the first (or upper) finger 58 of a first receiver 50a adjacent the planar surface 60 engaging the corresponding rearward portion of a second, adjacent receiver 50b. As a result of this reception, the slats 16 are skewed slightly in the vertical direction. This results in a small space S or gap being established and maintained between the adjacent slats 16 (see FIG. 9b). As should be appreciated, engagement between opposite portions of the receivers 50a, 50b creates a similar result (i.e., a gap or space S between the slats 16) along the return run N (see, e.g., FIGS. 10a-10c) when the receivers 50a, 50b are in contact.

Figure 11:
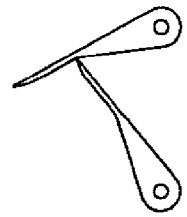
FIG. 11 is a schematic view illustrating the possible effects of uncontrolled pivoting of the slats.

Even if slight, the ability to maintain this space S or gap between adjacent slats 16 during relative movement in an automatic and reliable fashion is advantageous for several reasons. Primarily, this keeps the slats 16 from frictionally engaging each other when the chain 10 compresses, such as during side flexing. Aside from being generally of benefit from a wear standpoint, this lack of contact also helps to maintain the integrity of any low function or like protective coating applied to the surface of the slats 16. A secondary benefit is that the control afforded by the receivers 50a, 50b prevents adjacent slats 16 from freely pivoting and assuming undesirable positions in which the slats become inter-engaged. This is especially beneficial along the transition from the forward run F to the return run N, where adjacent slats 16 can interact in an undesirable fashion and possibly become "tented" in a manner that prevents further movement (see FIG. 11).

As a result, the natural pivoting movement of the slats 16 is ensured as the transition from the forward to the return run is made. In order to prevent debris from entering the opening 16a in each slat 16, it may be sealed. For example, as shown in FIGS. 7a and 7b, a bushing 66 may be provided on each connector 14. As shown in FIG. 7c, a corresponding seating recess 68 may also be provided in each receiver 50 for receiving the bushing 66. The bushing 66 in this position may thus not only help to seal the openings in the receiver 50 and slat 16 against the entry of dirt and debris (thereby resulting in a more sanitary and easier to clean arrangement), but also helps to reduce relative friction between the elements.

Figure 12:
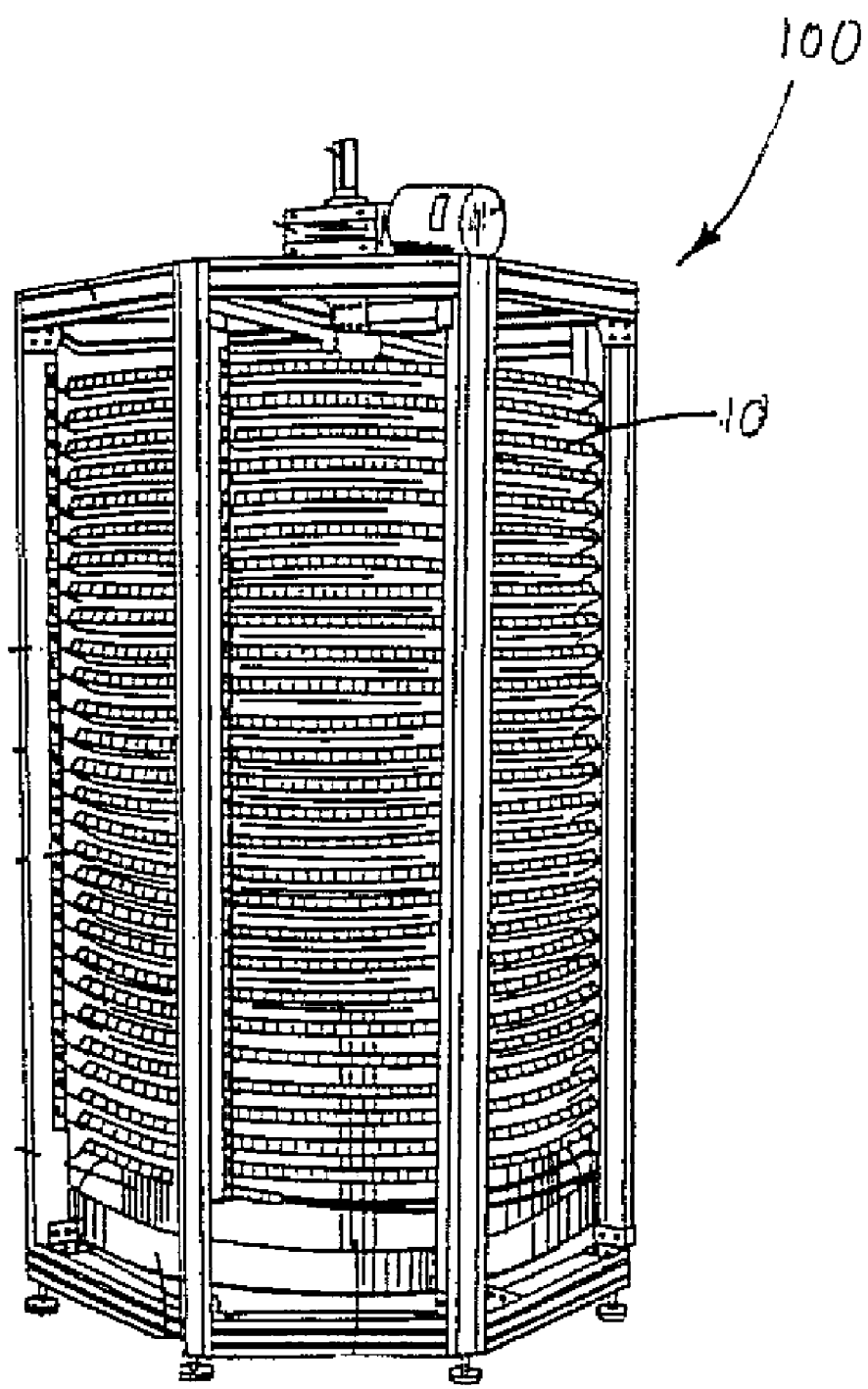
FIG. 12 is a spiral conveyor incorporating a side flexing conveyor chain with slats.

The arrangements of a side-flexing slat conveyor chain 10 described above are believed to have particular utility with spiral conveyor systems of the type in which the chain is driven in a generally spiral or helical path, at least along the forward run. Specifically, in the case of a spiral "freeze" 100 as shown in FIG. 12, the slats incorporated in the chain 10 may be cooled from an external source in order to lower the temperature of the articles being conveyed. Even in the absence of such active cooling, the slats when used in a spiral conveyor 100 would help to effect the desired thermal transfer for cooling the articles in a more efficient fashion and without occupying a significant amount of floorspace.

To improve thermal transfer to the articles, it may be desirable to fabricate the slats 16 of a material having a high degree of thermal conductivity, such as various metals including aluminum. However, it is also possible to make the slats out of polymer materials, which are not only lighter, but generally less susceptible to corrosion and oxidation than metal. Ceramics and composite materials are, of course, also viable options. Coatings and surface treatments may also be used as desired to prevent articles from adhering during conveyance.

The foregoing descriptions of various embodiments of the invention are provided for purposes of illustration, and are not intended to be exhaustive or limiting. Modifications or variations are also possible in light of the above teachings. For example, while shown as being operated such that the slats 16 are driven in a particular direction, with the second end 16c leading, it should be appreciated that the chain 10 can be driven bi-directionally. Also, it may be possible to maintain the desired spacing of the slats 16 during compression using only one receiver 50 along one side of the chain 10. The embodiments described above were chosen to provide the best application to thereby enable one of ordinary skill in the art to utilize the disclosed inventions in various embodiments and with various modifications as are suited to the particular use contemplated. All such modifications and variations are within the scope of the invention.

The invention claimed is:

1. A modular link conveyor chain capable of assuming an at least partially compressed and an expanded condition as the result of side-flexing, and moving along a forward run and a return run in an endless path in a conveying direction, comprising:
    a plurality of links arranged in rows spaced apart in the conveying direction, the links in at least a first row including first aligned apertures and the links in at least a second row including second, oversized apertures for aligning with the aligned first apertures of the links in the first row;
    a first connector associated with the first and second apertures for interconnecting the first and second rows of links; and
    at least one elongated slat pivotally mounted between the links and supported by the first connector, the slat forming at least part of a substantially continuous conveying surface along the forward run.

2. The modular link conveyor chain according to claim 1, wherein a connector extends between a plurality of the rows of links, and a plurality of the connectors associate with at least one elongated slat.

3. The modular link conveyor chain according to claim 2, wherein adjacent slats mounted on the connectors are capable of nesting at least partially within each other in the compressed condition of the chain.

4. The modular link conveyor chain according to claim 2, wherein a gap is provided between adjacent elongated slats along the forward run.

5. The modular link conveyor chain according to claim 1, wherein each row of links includes at least two side links, each side link defined by the inclusion of a depending arm and an inwardly projecting tab.

6. The modular link conveyor chain according to claim 2, further including a spacer for spacing adjacent slats from each other in the compressed condition of the chain.

7. A conveyor system incorporating the chain of claim 1, and in which the forward run comprises a spiral path.

8. A modular link conveyor chain capable of assuming a compressed and an expanded condition in the conveying direction and moving along a forward run and a return run in an endless path, comprising:
    a plurality of links arranged in rows spaced apart in the conveying direction, each link including first apertures and second oversized apertures for aligning with the first apertures of an adjacent link;
    a first connector associated with the first and second apertures;
    a first elongated slat pivotally supported by the first connector; and
    a second elongated slat arranged to overlap with the first slat at least along the forward run when the chain is in the compressed condition.

9. The chain according to claim 8, further including a spacer for preventing the overlapped first and second slats from making direct contact.

10. The chain according to claim 9, wherein the spacer comprises a receiver for receiving a first side of the first or second slat.

11. The chain according to claim 9, wherein one of the connectors carries the spacer.

12. The chain according to claim 9, wherein the spacer comprises a first receiver supported by a first connector and further including a second receiver supported by a second connector spaced from the first connector in the conveying direction.

13. The chain according to claim 9, wherein the first receiver engages the second receiver when the chain is at least partially in the compressed condition.

14. A modular link conveyor chain capable of side flexing and moving along a forward run and a return run in an endless path, comprising:
    a plurality of links arranged in rows spaced apart in a conveying direction, the links in each row including first apertures and second, oversized apertures for aligning with the first apertures of an adjacent link when interdigitated;
    a plurality of connectors, each associated with the first and second apertures of each row of links; and
    a plurality of elongated slats mounted for pivoting movement between the links, at least one of said slats arranged to at least partially nest within a recess formed in the next-adjacent slat when the chain side flexes or undergoes longitudinal compression.

15. The chain according to claim 14, further including a spacer for preventing adjacent slats from directly contacting each other in the compressed condition in order to avoid direct frictional contact among and reduce wear on the slats.

16. A method of operating a conveyor chain including a plurality of pivoting, elongated slats, comprising:
    moving the conveyor chain along a forward run in a compressed condition, with each elongated slat spaced from and at least partially overlapping with an adjacent slat to form a substantially continuous conveying surface; and
    driving the conveyor chain along a curve such that the slats overlap to a greater extent along the inside of the curve than the outside of the curve.

* * * * *